United States Patent [19]

Knemeyer

[11] Patent Number: 4,527,998
[45] Date of Patent: Jul. 9, 1985

[54] BRAZED COMPOSITE COMPACT IMPLEMENTS

[75] Inventor: Friedel S. Knemeyer, Granville, Ohio

[73] Assignee: General Electric Company, Worthington, Ohio

[21] Appl. No.: 624,064

[22] Filed: Jun. 25, 1984

[51] Int. Cl.³ .............................................. B24D 3/02
[52] U.S. Cl. ......................................... 51/309; 51/293
[58] Field of Search .................................. 51/293, 309

[56] References Cited

U.S. PATENT DOCUMENTS

| | | | |
|---|---|---|---|
| 3,745,623 | 7/1973 | Wentorf, Jr. et al. | 76/101 A |
| 4,186,628 | 2/1980 | Bonnice | 76/101 A |
| 4,225,322 | 9/1980 | Knemeyer | 51/309 |
| 4,319,707 | 3/1982 | Knemeyer | 51/309 |

Primary Examiner—Paul Lieberman
Assistant Examiner—Willie Thompson
Attorney, Agent, or Firm—Robert R. Schroeder

[57] ABSTRACT

Disclosed is an improved implement comprising a cemented carbide supported composite abrasive compact which is brazed to a cemented carbide substrate with a brazing filler metal having a liquidus substantially above 700° C. The composite compact preferably is a composite polycrystalline diamond compact. The brazing filler metal is a brazing alloy having a liquidus not substantially above 1,004° C. and which has the following composition, by weight:

Au: 18–39.5%
Ni: 3.5–14.5%
Pd: 2.5–10.5%
Mn: 7.5–9.0%
Cu: Balance.

26 Claims, 4 Drawing Figures

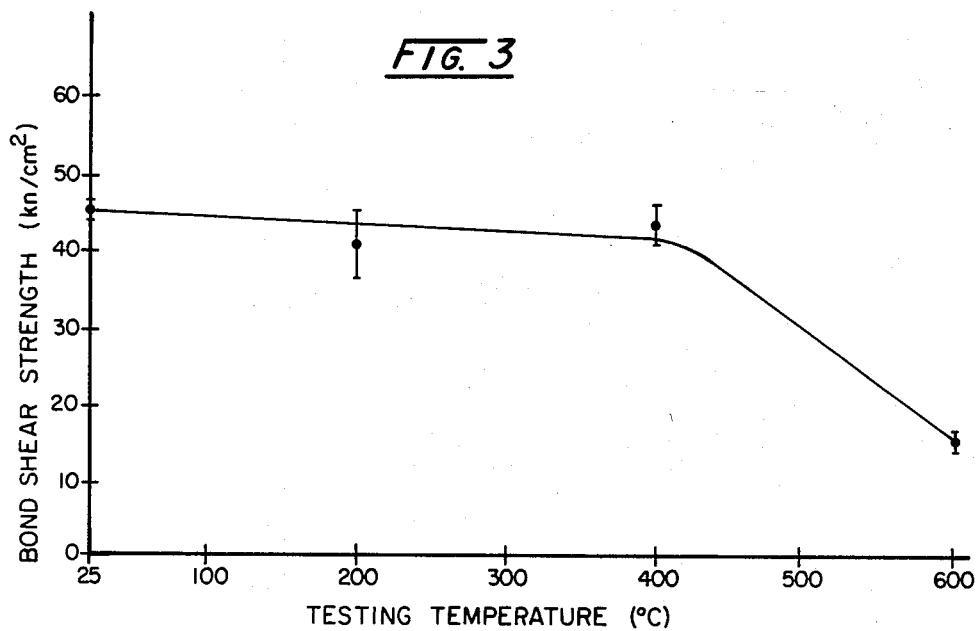
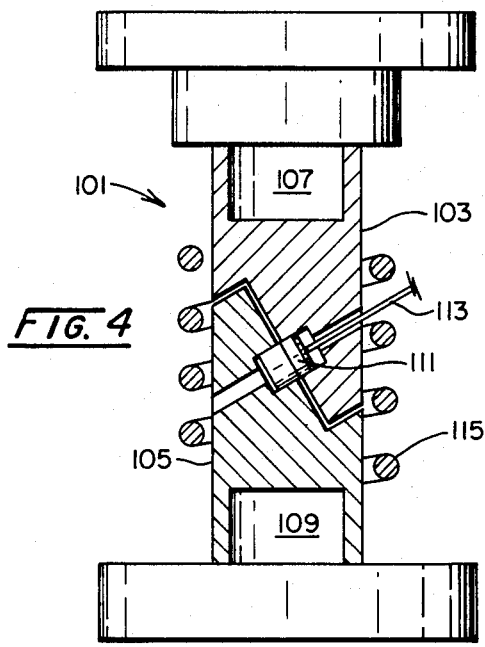

BRAZED COMPOSITE COMPACT IMPLEMENTS

TECHNICAL FIELD

This invention relates to implements incorporating abrasive particle compacts and more particularly to drilling and cutting implements having such compacts mounted thereon and to methods for fabricating the same. Such abrasive particle compact implements have found special utility in drill bits for oil and gas exploration and in mining applications.

BACKGROUND ART

An abrasive particle compact is a polycrystalline mass of abrasive particles such as diamond and/or cubic boron nitride bonded together to form an integral, tough, high-strength mass. Such components can be bonded together in a particle-to-particle self-bonded relationship, or by means of a bonding medium disposed between the particles, or by combinations thereof. For examples, see U.S. Pat. Nos. 3,136,615; 3,141,746, and 3,233,988. A supported abrasive particle compact herein termed a composite compact, is an abrasive particle compact which is bonded to a substrate material, such as cemented tungsten carbide. Compacts of this type are described, for example, in U.S. Pat. Nos. 3,743,489; 3,745,623, and 3,767,371. The bond to the support can be formed either during or subsequent to the formation of the abrasive particle compact.

Composite compacts have found special utility as cutting elements in drill bits. These compacts can be attached directly to the drill crown of drill bits by a variety of techniques. U.S. Pat. No. 4,156,329 proposes to furnace braze a pretinned metal-coated compact to recesses formed in the crown. U.S. Pat. No. 4,186,628 proposes to attach the compact cutters to the crown by placing the compacts in a mold, filling the crown portion of the mold with powder, and running a low temperature infiltration braze into the mold to form the crown containing the compacts embedded therein. U.S. Pat. No. 4,098,362 proposes drill bits in the manner of the latter proposal wherein the cutters are placed at a rake angle of between −10° and −25°.

Alternatively, composite compacts can be affixed to an elongated stud or substrate which stud is then attached to the drill crown. The stud provides greater attachment area to the drill crown. It also provides more support for the abrasive particle compact thereby increasing its impact resistance. Composite compacts have been attached to studs in both a right cylinder configuration as depicted in U.S. Pat. No. 4,200,159, and in an angled configuration, as shown, for example, in U.S. Pat. No. 4,265,324.

Although the benefits of attaching a composite compact to a stud or substrate are apparent, problems have been encountered in achieving the actual attachment. In particular, it has been noted that composite compacts in which the abrasive portion is self-bonded and metal infiltrated such as described in U.S. Pat. No. 3,745,623 and available commercially under the trademarks Compax and Syndite are susceptible to thermal damage if exposed to temperatures in excess of about 700° C. (As used herein self-bonded means that the abrasive particles are directly bonded one to another.) This damage is thought to result from a differential in the thermal expansion rate of the abrasive and metal phases. At elevated temperatures there is also a risk of degradation to the particles themselves as by graphitization or oxidation. This type of degradation is thought to be of concern for all types of abrasive particle compacts. Accordingly, braze alloys with liquidus temperatures of less than 700° C. were initially utilized for attachment of composite compacts to studs or substrates. Unfortunately, such low temperature braze alloys found only limited applicabilty in the marketplace due to their characteristially low bond strengths.

A major breakthrough in the attachment of composite compacts to substrates was made by Knemeyer in U.S. Pat. Nos. 4,225,322 and 4,319,707. The Knemeyer process permits the use of high temperature braze alloys for attaching a composite compact to a substrate. Such high temperature braze alloys, in turn, provide significantly greater bond strengths. While the Knemeyer method and apparatus permit the use of high temperature braze alloys, difficulty has arisen in the selection of a suitable one. For example, Anaconda 773 filler metal, initially proposed in the Knemeyer patents, is now thought to be undesirably reactive with the carbide pieces being joined.

Complicating the braze material selection is the fact that the braze must not only be suitable for joining a composite compact support to a substrate, but it must also be capable of withstanding subsequent manufacturing and operating conditions. For example, a common manufacturing method includes first tinning the brazed implement and then furnace brazing the pre-tinned implement to recesses cut in a drill crown in the manner of U.S. Pat. No. 4,156,329 (cited above). Braze joints made using prior braze materials have had difficulty in withstanding such tinning and furnace brazing operations. Bond strength during these operations is especially critical since the bond is believed to be under tensile strain following the initial brazing procedure. Finally, to function in typical drilling environments it is thought that the braze joint must be designed to be capable of withstanding temperatures of up to about 400° C. in an oxidizing atmosphere while being subjected to continuous impact loading as would be the case if heterogeneous formations were encountered.

BROAD STATEMENT OF THE INVENTION

The present invention is directed to an implement which comprises a composite compact which is brazed to a substrate with a brazing filler metal which has a liquidus substantially above 700° C. The improved component of the implement comprises a brazing filler metal which is an alloy having a composition in the following range, by weight:

| Au | 18-39.5% | | Au | 34.5-36.0% |
|----|----------|---|----|----------|
| Ni | 3.5-14.5% | | Ni | 13.5-24.5% |
| Pd | 2.5-10.5% | and preferably | Pd | 9.5-10.5% |
| Mn | 7.5-9% | | Mn | 9.0-10.5% |
| Cu | Balance | | Cu | Balance |

The brazing alloy has a liquidus temperature not substantially above about 1,004° C. The method of joining the support of a composite compact to a substrate with the foregoing brazing alloy is another aspect of the present invention. Advantageously, the compact is selected from polycrystalline cubic boron nitride and diamond composite compacts. The support and substrate are advantageously comprised of a material selected from the group consisting of tungsten carbide, titanium carbide, tungsten-molybdenum carbide, and tantalum carbide wherein the metal bond material for the carbide is selected from the group consisting of cobalt, nickel, iron and mixtures thereof, an elemental metal which forms a stable nitride or boride, and a metal alloy which forms a stable nitride or boride. Preferably both the substrate and the support are of the same type of carbide material, although not necessarily the same grade.

Advantages of the present invention include the formation of an alloy bond which possesses improved strength. Another advantage is an alloy bond which is stable to later application of heat, for example, by tinning, furnace brazing, operating conditions and combinations thereof. A further advantage is a much improved degree of reliability and reproduceability of the alloy bond. These and other advantages will be readily apparent to those skilled in the art based upon the disclosure contained herein.

BRIEF DESCRIPTION OF THE DRAWINGS

FIG. 3 diagrammatically plots the shear strength obtained by the brazing alloy of the present invention at various elevated temperatures; and FIG. 4 is a schematic diagram of a test fixture which has been modified for testing as described in Example 1.

The drawings will be described in detail in connection with the following description.

DETAILED DESCRIPTION OF THE INVENTION

Figure 1:
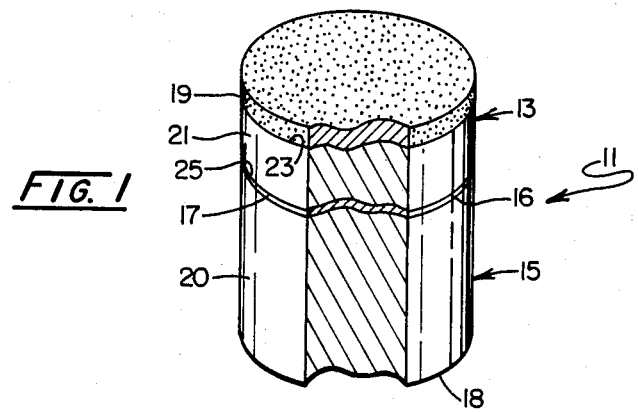
FIG. 1 is a fragmentary perspective view of a component in accordance with the features of this invention.

FIG. 1 shows an implement 11 in accordance with an embodiment of the invention. The implement 11 is comprised of a composite compact 13, a stud or substrate 15, and a thin continuous layer 17 of filler metal (shown disproportionately larger for purposes of illustration) disposed between and bonding the substrate 15 to the compact 13 along an interface 16. The component configuration may be varied to suit the particular application, eg. the interface 16 may be angled relative to the main body of the substrate 15.

The composite compact 13 is comprised of a polycrystalline particulate mass or layer 19 of bonded abrasive particles and a support or base layer 21 preferably of cemented carbide bonded to the compact 13 along an interface 23. The bonded abrasive particles of the compact 19 may be diamond and/or cubic boron nitride. The carbide support 21 also is provided with oppositely disposed surface 25. In a preferred embodiment, layer 19 of the compact 13 is comprised by volume of at least 70% diamond and preferably in excess of 90% diamond in a diamond-to-diamond self bonded state as explained in detail in U.S. Pat. No. 3,745,623. The remaining 30% or less primarily is comprised of the bonding material, preferably cobalt (or alloys), of the cemented carbide mass 21 which is infiltrated into layer 19 as a second phase to the diamond first phase during a high temperature/high pressure fabrication process. In an alternative embodiment, the compact 13 may be comprised of a hard phase boron nitride layer 19 constructed in accordance with U.S. Pat. No. 3,743,489 or U.S. Pat. No. 3,767,371. Though only cubic boron nitride is disclosed in these references, the hard hexagonal form may be substituted in whole or in part for the cubic form.

The substrate 15 preferably is comprised of cemented carbide and preferably is of the same type of carbide as the support 21. Cemented carbide is preferable, particularly in drill bit applications, because of its hardness and impact resistance. The filler metal 17 is a high temperature, high strength brazing filler metal having a liquidus greater than 700° C. This temperature is generally recognized to be a threshold degradation temperature of self-bonded diamond and boron nitride composite compacts, which have a second metal phase in the abrasive layer 19. The high strength brazing alloy of the present invention has the following nominal composition by weight:

| Ingredient | Broad Range | First Preferred Range |
| --- | --- | --- |
| Au | 18–39.5% | 34.5–36.0% |
| Ni | 3.5–14.5% | 13.5–24.5% |
| Pd | 2.5–10.5% | 9.5–10.5% |
| Mn | 7.5–9.0% | 9.0–10.5% |
| Cu | Balance | Balance |

The brazing alloy should have a liquidus temperature not substantially in excess of about 1,004° C. and such liquidus temperature broadly ranges from about 700° C. to 1,004° C. The first preferred brazing alloy (available as brazing alloy RI 46 from GTE Wesgo, Belmont, Ca.) has a liquidus temperature of 1,004° C. and a solidus temperature of 971° C. The first preferred brazing alloy unexpectedly provides excellent bonds between the two carbide pieces being joined and remains useful after being subjected to normal manufacturing procedures and during use. The alloy spreads evenly in the joint and has not been seen to interact undesirably with the cemented tungsten carbide support or substrates tested sofar or any components thereof. Moreover, this preferred brazing alloy provides a degree of reliability and reproduceability which has not been achieved by use of prior proposed filler metals. The second preferred brazing alloy (available as brazing alloy RI 49 from GTE Wesgo, Belmont, Ca.) has a liquid temperature of 949° C. and a solidus temperature of 927° C. While only the first preferred alloy has been tested thus far, the related alloys noted below as second, third and fourth ranges are also believed to be appropriate alternatives based on their similar compositions. The alloy of the second range in particular is throught to be an alternative to the alloy of the first preferred range due to their very similar composition and published yield strengths. Alloys formed of the indicated second, third and fourth composition ranges have been produced by GTE usage as braze alloys RI 49, RI 47 and RI 48 respectively, although only RI 46 and RI 49 are understood to be generally available. The broad range indicated above correspondingly encompasses the first preferred ranges.

| Ingredient | Second Range | Third Range | Fourth Range |
| --- | --- | --- | --- |
| Au | 30–32% | 37.5–39.5% | 18–20% |
| Ni | 9–10.5% | 3.5–4% | 6.5–8% |
| Pd | 9–10.5% | 2.5–3% | 5.5–7% |
| Mn | 14.5–17.5% | 7.5–9% | 23–26% |
| Cu | Balance | Balance | Balance |
| Liquidus | 949° C. | 960° C. | 916° C. |
| Solidus | 927° C. | 916° C. | 893° C. |

As mentioned, Anaconda 773 filler metal (Cu 50%, Zn 40%, Ni 10%, melting point range 950°–960° C.), noted in U.S. Pat. Nos. 4,225,322 and 4,319,707 is now thought to be undesirably reactive with the carbide pieces being joined and additionally does not provide adequate bond strength at higher temperatures of use contemplated for the composite compact components. Another previously proposed brazing filler metal is BAg-1 (ASW-ASTM classification) which is a low temperature brazing filler metal that provides braze bond strengths even below those provided by Anaconda 773 filler metal. Another brazing filler metal which has been proposed is TiCuSil (Ti 4.5%, Cu 26.7%, Ag balance, melting point range 840°–850° C.). However, TiCuSil does not braze well unless brazing is conducted under vacuum or an inert atmosphere.

In contrast, the brazing alloy for use in the present invention has not exhibited these shortcomings and also provides an initial excellent bond strength at ambient temperature. Moreover such bond strength is substantially maintained over high temperatures of manufacture and use required of the composite compact components. The bond strength, as determined by shear strength measurements, is especially good in comparison to other alloys tested at potential end use operating temperatures of about 200°–400° C. and especially of about 300°–400° C. This again is in contrast with prior brazing filler metals which may have provided initial ambient temperature bond strength, but did not maintain their strength to the same degree as the alloy of the present invention as elevated temperature ranges are encountered during reheating in manufacturing or operation.

Another unexpected advantage in using the brazing alloy disclosed herein is the reproducibility of the bond strength described above. Testing has thus far indicated that essentially no composite compact components brazed with the disclosed alloy composition need be rejected for failing to meet design specifications of bond strength. Thus, unexpectedly, the excellent reliability which the brazing alloy provides more than compensates in yield gains for the expected higher cost in using an alloy composition containing gold. The excellent bond strength and reliability which the brazing alloy provides in this application was also unexpected for a brazing alloy composition which has such a complex mixture of ingredients. The examples will demonstrate the usefulness of the brazing alloy.

In implementing the present invention, the braze alloy is heated above its solidus temperature which is 971° C. in the case of the first preferred alloy. As noted above, this of course is in excess of the generally recognized degradation temperature of 700° C. for self-bonded, second phase metal infiltrated composite compacts typically employed in current drill bit applications. Even in the case of more thermally stable compacts such as described in U.S. Pat. Nos. 4,288,248 and 4,151,686, it is thought that unnecessarily elevated abrasive particle temperatures in the layer 19 should be avoided. Accordingly, it is recommended that a method and apparatus such as described in U.S. Pat. Nos. 4,225,322 and 4,319,707 be employed in practicing this invention.

Figure 2:
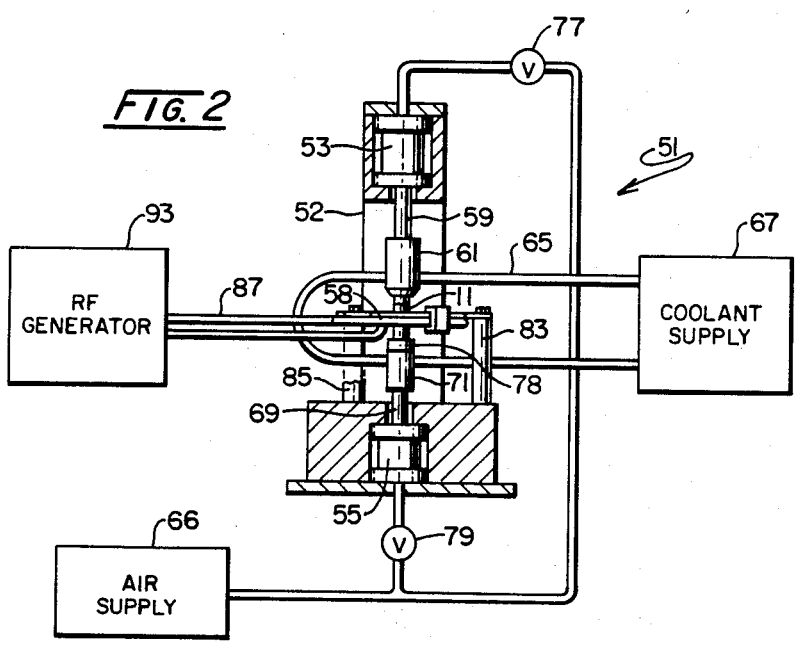
FIG. 2 is a schematic diagram of an apparatus for fabricating a component in accordance with the present invention.

Referring to the apparatus of U.S. Pat. No. 4,319,707 as depicted in FIG. 2, an apparatus 51 for fabricating a component 11 is comprised of a frame member 52 to which is fixed a pair of pneumatic cylinders shown at 53 and 55 for holding, relative to an induction coil assembly 58, a component 11 for brazing. The pneumatic cylinder 53 comprises a plunger 59 with a head 61 for receiving one end of the composite compact 13. The head 61 may be recessed to help align the compact 13 to the substrate 15. Alternatively it may be non-recessed and another means such as a ceramic sleeve (not shown) can be used to maintain proper part alignment before brazing. The head 61 is also provided with a coolant, preferably water, via a tube 65 from a coolant supply 67 of conventional construction. The head 61 and coolant supply 67 together function as a heat sink for the diamond layer or table 19 during the brazing of a compact 13 to a substrate 15. Preferably, a deformable heat conductive material, such as a copper disc, is placed between the diamond layer 19 of the compact 13 and the head 61 to improve thermal conductivity from the layer 19 to head 61.

The pneumatic cylinder 55 similarly is comprised of a plunger 69 with a head 71 fixed at one end thereof. A cup-shaped ceramic insulator 78 is positioned on the head 71 for supporting one end 18 of a substrate 15 for preventing the heat sinking of the substrate to the head 71 during brazing operations. The head 71 also is interconnected to the coolant supply 67 via tube 65.

The pneumatic cylinders 53 and 55 are supplied with air under pressure from an air supply 66 through control valves 77 and 79, respectively. When extended, the plungers 59 and 69 position a component 11 coaxially of the induction assembly coil 58 which is supported on the frame 52 by supports 83 and 85. A third support for the assembly 58 is not shown in the drawings. Also not shown in the drawings is the coil assembly construction. The coil 58 is interconnected by RF generator 93 for power. For details of such coil assembly construction, reference is made to U.S. Pat. Nos. 4,225,322 and 4,319,707. It should be noted that the temperature of the diamond layer 19 may be monitored during brazing operations, if desired, by conventional tactile and non-tactile means in conventional fashion. Thus, the use of thermocouples, fiber optics, and other sensors may be employed as a precaution in order to assure that the coolant supply is operating properly for preventing the temperature of the diamond layer 19 from exceeding a critical threshold temperature at which thermal damage occurs. Such monitoring may be accomplished for example by drilling a hole through the vertical center of the head 61 so that a sensing contact with the diamond layer 19 can be established for monitoring its temperature. In this regard, it has been found that the self-bonded, second phase-infiltrated diamond layer 19 described above of compacts typically used in drilling applications apparently can withstand short temperature excursions (bursts) above 700° C. as indicated in the following example without showing visible signs of thermal damage which would otherwise occur with normal heating above 700° C.

The following examples show how the present invention can be practiced but should not be construed as limiting. In this application, all percentages and parts are by weight and all units are in the metric system, unless otherwise expressly indicated. Also, all references cited herein are incorporated herein expressly by reference.

EXAMPLE 1

Several self-bonded, second phase metal-infiltrated polycrystalline diamond compacts having cobalt-cemented tungsten carbide support layers (Product 2530-NC Stratapax Drill Blank, General Electric Company, Worthington, Ohio) were bonded to right cylindrical 13.4 mm Carboloy grade 55 B cobalt-cemented tungsten carbide substrates in accordance with the method and apparatus disclosed in U.S. Pat. Nos. 4,225,322 and 4,319,707 with the following exceptions. First, the bonding alloy employed was obtained as alloy RI 46 (First Preferred Range alloy described above) manufactured by GTE Wesgo, Belmont, Calif. Second, a copper disc was used to conduct heat between the diamond layer 19 and the head 61. Finally, the temperature of the diamond layer 19 was monitored as noted above.

The bonding was performed by heating the interface region between the support and substrate for 14 seconds. Power to the heating induction coil was adjusted such that an estimated diamond table peak temperature of about 800°–900° C. was achieved. The bonded implements were then all subjected to shear strength measurements employing a conventional load testing machine using a modified test fixture. More specifically, the machine was conventional in construction except for the non-collet fixture identified generally at FIG. 4 at 101 and composed of an upper portion 103 and an identical lower portion 105. Areas 107 and 109 are void areas to reduce heat loss out of the ends of fixture portions 103 and 105, respectively. An induction coil assembly 115 circumscribes fixture portions 103 and 105 and enables the heating of a sample implement 111 during the application of force for shear testing. The sample implement 111 is retained within recesses formed within the upper and lower fixture portions 103 and 105 as shown in FIG. 4. Additionally, each recess has an opening therefrom extending to the outside for insertion of a thermocouple 113 which is used to sense the diamond table temperature obtained during the shear force testing. This fixture design was made necessary because the standard collet fixture for the machine did not permit the induction coil assembly 115 to be utilized during the shear testing procedure.

An as-bonded group of five implements was tested first. Next, a second set of the bonded implements was tinned by immersion in molten BAg-1 braze alloy for producing a pre-tinned component as described in U.S. Pat. No. 4,156,329. In this tinning process, the braze joints were subjected to temperatures between 650° C. and 700° C. for up to about 120 seconds. Finally, a third set of the brazed components were similarly tinned and then furnace-brazed. Furnace-brazing for present purposes comprehends a linear ramp heating of the components from room temperature to 700° C. for over approximately 1 hour after which the component is maintained at 700° C. for about 15 minutes. As noted above, furnace-brazing is a conventional method for attaching the components to drill crowns. The bonds formed by the brazing alloy must be able to withstand such conventional tinning and furnace-brazing conditions since they are often employed in use. The following results were recorded.

TABLE 1

| | Shear Strength (kn/cm$^2$) | | |
|---|---|---|---|
| | As Bonded | Tinned | Tinned and Brazed |
| | 51.09 | 57.09 | 38.13 |
| | 49.57 | 48.95 | 48.06 |
| | 48.68 | 34.27 | 36.06 |
| | 53.16 | 53.78 | 59.50 |
| | 55.57 | 48.06 | 38.47 |
| Mean | 51.64 | 48.40 | 44.06 |

TABLE 1-continued

| | Shear Strength (kn/cm$^2$) | | |
|---|---|---|---|
| | As Bonded | Tinned | Tinned and Brazed |
| Std. Deviation | 2.76 | 8.76 | 9.79 |

Generally, bond strengths of greater than about 35 kn/cm$^2$ are though to be desirable in order for the bond strength to be clearly sufficient for use in drill bits and other applications. The above-tabulated results clearly show that the bond strength of the braze alloy of the present invention exceeds the bond strength minimum. Of special interest is the fact that the bond strength was maintained even after the elevated temperature tinning and furnace brazing cycles. This despite the fact that such bonds are generally under a tensile load after the initial brazing, which load is thought to contribute towards the relatively high failure rate after such post-braze processing using prior art brazing materials. While some loss of bond strength due to tinning and furnace-brazing is noted above, it should be understood that such results are not entirely consistent with later-generated data. Later-generated data, as included in the following examples, shows that the bond strength is maintained during tinning and furnace-brazing operations and often, furnace-brazing leads to improved bond strength. The somewhat inconsistent results displayed above may be due to variability in the equipment used or may be anomolous results.

Next, additional samples of the as-brazed components were subjected to shear strength measurements at various temperatures which would be expected to be encountered during drilling and other operations utilizing such brazed implements. Data was collected on a conventional hydraulic press using a fixture which had been modified to accommodate an induction coil for heating as described above and depicted in FIG. 4. The following results were recorded.

TABLE 2

| | Shear Strength (kn/cm$^2$) | | | |
|---|---|---|---|---|
| | Ambient | 200° C. | 400° C. | 600° C. |
| | 47.44 | 47.44 | 39.37 | 15.31 |
| | 44.47 | 32.47 | 48.06 | 15.03 |
| | 44.47 | 48.33 | 42.95 | 19.24 |
| | 45.64 | 38.13 | 42.95 | 18.62 |
| Mean | 45.51 | 41.58 | 43.37 | 17.03 |
| Std. Deviation | 1.38 | 7.65 | 3.59 | 2.21 |

Again, the excellent bond strengths provided by the brazing alloy are demonstrated even at elevated temperatures of operation. The results displayed in Table 2 are depicted graphically in FIG. 3. Note that the bond strength is substantially maintained from about room temperature to about 400° C. Bond strength in the operating range of between about 200° and 400° C., is considered quite important and the continued good results in this range by the alloy of the subject invention is thought to be very beneficial.

EXAMPLE 2

Additional bonded composite compact implements as described in Example 1 were similarly brazed for 11 seconds with the alloy described in Example 1 at different sensed diamond layer temperatures. These tests, which included five samples per sensed temperature, were conducted in order to ascertain whether bonding temperature affected the bond strength. The following results were recorded using a conventional hydraulic press.

TABLE 3

| Approximate Sensed Diamond Surface Temp. (°C.) During Brazing | Average Shear Strength (kn/cm²) |
| --- | --- |
| 810 | 35.16 ± 2.69 |
| 860 | 51.02 ± 1.86 |
| 910 | 48.95 ± 2.14 |
| 970 | 47.57 ± 8.62 |

The above-tabulated results again show the excellent bond strengths which are obtained by use of the alloy composition disclosed herein. Additionally, it appears that a threshold bond temperature is reached, above which no significant improvement in bond strength is obtained. This characteristic of the bonding alloy is advantageous since the diamond table need not be subjected to ever increasing higher temperatures in order to improve bond strengths, such as was the case for some prior filler metals.

EXAMPLE 3

Similar composite compact implements with a somewhat thickner carbide support layer 21 were brazed for 11 seconds with the same type of alloy at various sensed diamond layer temperatures using the same procedures as in the proceeding examples. Thereafter, the components (five samples per sensed temperature range) were furnace-brazed under furnace-brazing conditions described above. The following results were recorded on a conventional hydraulic press unit with the fixture depicted in FIG. 4.

TABLE 4

| Sensed Diamond Temp (°C.) During Brazing | Average Shear Strength |
| --- | --- |
| 800–849 | 46.19 ± 4.14 |
| 850–880 | 53.78 ± 1.79 |
| 850–880 | 52.40 ± 2.34 |
| 881–910 | 50.33 ± 2.55 |

The above-tabulated results again demonstrate the unexpected excellent post-furnace brazed shear strength obtained by use of the brazing alloys of the present invention. Additionally, a threshold bonding temperature again is indicated. The bond strengths also are at least the same or slightly higher than the bond strength reported in Example 2, Table 3. Such improved bond strengths following post furnace-brazing may be due to stress relief which the post furnace-brazing provides, although this is not experimentally proven. Nevertheless, bonds of the brazing alloy clearly provide excellent shear strengths initially and under conditions experienced in use in the field.

EXAMPLE 4

Additional composite compacts were brazed to cemented tungsten carbide substrates as in the previous examples using the braze alloy of Example 1. Some of the components were right cylinders as depicted in FIG. 1 and additional samples were configured with the substrate 20 having a surface 17 angled at about 60° relative to the main shank portion of the substrate 20 (hereinafter "angle cylinder"). 15 samples per each condition were tested for bond strength "as bonded", tinned, and tinned plus post furnace-brazing. The straight cylinder samples were bonded for about 9 to 12 seconds up to an average peak sensed diamond layer temperature of 886° C. while the angle cylinders were bonded up to an average peak sensed temperature of 876° C. for 30 seconds. The following results were recorded on a conventional hydraulic press unit with the fixture depicted in FIG. 4.

TABLE 5

| | Shear Strength (kn/cm²) | |
| --- | --- | --- |
| | No. of Samples | Average Shear Strength |
| Straight Cylinders | | |
| As Bonded | | 49.64 ± 2.76 |
| Tinned | | 52.40 ± 1.65 |
| Tinned and Furnace-Brazed | | 52.40 ± 4.14 |
| Angle Cylinders | | |
| As Bonded | 3 | 51.71 ± 4.14 |
| | 12 | 58.61 |
| Tinned | 7 | 53.09 ± 2.55 |
| | 8 | 58.61 |
| Tinned and Furnace-Brazed (1 hour) | 3 | 54.47 |
| | 12 | 58.61 |
| Tinned and Furnace-Brazed (3 hours) | 2 | 50.33 ± 9.3 |
| | 13 | 58.61 |

The bond strength achieved for the 15 straight cylinder samples again are excellent. For the angle cylinder samples, however, many of the samples could not be broken even at the capacity of the hydraulic press testing apparatus (58.61 kn/cm²). Such excellent results were experienced for samples as bonded, tinned, and post furnace-brazed for approximately one hour as such test is described above. Moreover, additional samples were furnace-brazed for approximately three hours and still possessed excellent bond strength, though some loss of bond strength for the samples which failed was noted.

Although the brazed implement of the present invention has been described in connection with specific examples and embodiments, it will be understood by those skilled in the art the variations and modifications of which this invention is capable without departing from its broad scope.

What is claimed is:

1. A brazed implement comprising a composite compact having an abrasive particle layer bonded to a support and a substrate bonded to said support by a brazing filler metal disposed therebetween which brazing metal is an alloy having a liquidus substantially above 700° C. and having the following composition, by weight:
   Au: 18–39.50%
   Ni: 3.5–14.5%
   Pd: 2.5–10.5%
   Mn: 7.5–9.0%
   Cu: Balance.

2. The brazed implement of claim 1 wherein said alloy has a liquidus temperature of about 1,004° C. and has the following composition, by weight:
   Au: 34.5–36.0%
   Ni: 13.5–14.5%
   Pd: 9.5–10.5%
   Mn: 9.0–10.5%
   Cu: Balance.

3. The brazed implement of claim 1 wherein said alloy has a liquidus temperature of about 949° C. and has the following composition, by weight:
   Au: 30–32%

Ni: 9–10.55
Pd: 9–10.5%
Mn: 14.5–17.5%
Cu: Balance.

4. The brazed implement of claim 1 wherein said alloy has a liquidus temperature of about 960° C. and has the following composition, by weight:
Au: 37.5–39.5%
Ni: 3.5–4%
Pd: 2.5–3%
Mn: 7.5–9%
Cu: Balance.

5. The brazed implement of claim 1 wherein said alloy has a liquidus temperature of about 916° C. and has the following composition, by weight:
Au: 18–20%
Ni: 6.5–8%
Pd: 5.5–7%
Mn: 23–26%
Cu: Balance.

6. The brazed implement of claim 1 wherein said support and said substrate are cemented carbides.

7. The brazed implement of claim 6 wherein both said support and said substrate are metal bonded carbides selected from the group consisting of tungsten carbide, titanium carbide, tungsten molybdenum carbide, and tantalum carbide, wherein the metal providing the metal bond is selected from the group consisting of cobalt, nickel, iron, and mixtures thereof.

8. The brazed implement of claim 6 wherein both said support and said substrate are cobalt-cemented tungsten carbide.

9. The brazed implement of claim 1 wherein said abrasive particle layer comprises a self-bonded polycrystalline diamond compact having an infiltrated metal second phase.

10. The brazed implement of claim 9 wherein said second phase comprises cobalt.

11. The brazed implement of claim 1 wherein said abrasive particle layer comprises a self-bonded polycrystalline cubic boron nitride compact having an infiltrated metal second phase.

12. A brazed implement comprising a composite compact having an abrasive particle layer bonded to a support and a substrate bonded to said support by a brazing filler metal disposed therebetween which brazing metal is an alloy having a liquidus substantially above 700° C. and having the following composition by weight:
Au: 34.5–36.0%
Ni: 13.5–14.5%
Pd: 9.5–10.5%
Mn: 9.0–10.5%
Cu: Balance.

13. The brazed implement of claim 12 wherein said support and said substrate are cemented carbides.

14. The brazed implement of claim 13 wherein both said support and said substrate are metal bonded carbides selected from the group consisting of tungsten carbide, titanium carbide, tungsten molybdenum carbide, and tantalum carbide, wherein the metal providing the metal bond is selected from the group consisting of cobalt, nickel, iron, and mixtures thereof.

15. The brazed implement of claim 14 wherein both said support and said substrate are cobalt-cemented tungsten carbide.

16. The brazed implement of claim 12 wherein said abrasive particle layer comprises a self-bonded polycrystalline diamond compact having an infiltrated metal second phase.

17. The brazed implement of claim 16 wherein said second phase comprises cobalt.

18. The brazed implement of claim 12 wherein said abrasive particle layer comprises a self-bonded polycrystalline cubic boron nitride compact having an infiltrated metal second phase.

19. In a method for fabricating a brazed implement comprised of a cemented carbide-supported composite compact having a layer of self-bonded abrasive particles infiltrated in a metal second phase, the support of said compact being bonded to a cemented carbide substrate by a brazing filler metal having a liquidus substantially above 700° C. and above the thermal degradation temperature of said compact, which method comprises brazing said compact support to said substrate while disposing the abrasive particle layer in thermal contact with a heat sink, the improvement which comprises using a brazing alloy having a liquidus temperature not substantially above about 1,004° C., and which has the following composition, by weight:
Au: 18–39.5%
Ni: 3.5–14.5%
Pd: 2.5–10.5%
Mn: 7.5–9.0%
Cu: Balance.

20. The improved method of claim 19 wherein said support is brazed to said substrate with a brazing alloy having a liquidus temperature of about 1,004° C. and having the following composition, by weight:
Au: 34.5–36.0%
Ni: 13.5–14.5%
Pd: 9.5–10.5%
Mn: 9.0–10.5%
Cu: Balance.

21. The improved method of claim 19 wherein said support is brazed to said substrate with a brazing alloy having a liquidus temperature of about 949° C. and the following composition, by weight:
Au: 30–32%
Ni: 9–10.5%
Pd: 9–10.5%
Mn: 14.5–17.5%
Cu: Balance.

22. The brazed implement of claim 19 wherein said alloy has a liquidus temperature of about 960° C. and has the following composition, by weight:
Au: 37.5–39.5%
Ni: 2.5–4%
Pd: 2.5–3%
Mn: 7.5–9%
Cu: Balance.

23. The brazed implement of claim 19 wherein said alloy has a liquidus temperature of about 916° C. and has the following composition, by weight:
Au: 18–20%
Ni: 6.5–8%
Pd: 5.5–7%
Mn: 23–26%
Cu: Balance.

24. The improved method of claim 19 wherein said cemented carbide support and said cemented carbide substrate are both metal bonded carbides selected from the group consisting of tungsten carbide, titanium carbide, tungsten molybdenum carbide and tantalum carbide, wherein the metal providing the metal bond is selected from the group consisting of cobalt, nickel, iron, and mixtures thereof.

25. The improved method of claim 19 wherein said abrasive particle layer of said composite compact comprises a metal-infiltrated self-bonded polycrystalline diamond compact.

26. The improved method of claim 19 wherein the abrasive particle layer of said composite compact comprises a metal-infiltrated self-bonded polycrystalline cubic boron nitride compact.

* * * * *